United States Patent [19]

Dobson, Jr. et al.

[11] Patent Number: 5,629,271

[45] Date of Patent: May 13, 1997

[54] METHODS OF REDUCING FLUID LOSS AND POLYMER CONCENTRATION OF WELL DRILLING AND SERVICING FLUIDS

[75] Inventors: James W. Dobson, Jr.; Paul D. Kayga; Jesse C. Harrison, III, all of Houston, Tex.

[73] Assignee: Texas United Chemical Corporation, Houston, Tex.

[21] Appl. No.: 217,726

[22] Filed: Mar. 25, 1994

[51] Int. Cl.$^6$ .................... C09K 7/00; E21B 43/04
[52] U.S. Cl. .................. 507/269; 507/140; 507/141; 507/145; 507/276; 507/277; 507/906; 166/278; 166/292
[58] Field of Search .................. 507/269, 276, 507/277, 906, 140, 141, 145; 166/281, 278, 292, 297

[56] References Cited

U.S. PATENT DOCUMENTS

| | | | |
|---|---|---|---|
| 4,046,197 | 9/1977 | Gruesbeck | 166/305 R |
| 4,192,756 | 3/1980 | Mondshine | 252/8.55 R |
| 4,621,692 | 11/1986 | Mondshine | 166/281 |

*Primary Examiner*—Philip Tucker
*Attorney, Agent, or Firm*—Roy F. House

[57] ABSTRACT

The invention provides methods for (1) reducing the fluid loss of and (2) reducing the concentration of polymer required to provide a desired degree of fluid loss control to, a well drilling and servicing fluid which contains at least one polymeric viscosifier, at least one polymeric fluid loss control additive, and a water soluble bridging agent suspended in an a liquid in which the bridging agent is not soluble, the methods comprising adding to the fluids a particulate, water soluble, ultra fine filtrate reducing agent having a particle size distribution such that at least 90% of the particles thereof are less than 10 micrometers and the average particle size is from about 3 to about 5 micrometers, the ultra fine filtrate reducing agent being insoluble in the liquid.

21 Claims, No Drawings

METHODS OF REDUCING FLUID LOSS AND POLYMER CONCENTRATION OF WELL DRILLING AND SERVICING FLUIDS

PRIOR ART

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores. This is particularly critical in conducting horizontal drilling operations within the producing formations.

Many clay-free fluids have been proposed for contacting the producing zone of oil and gas wells. See for example the following U.S. Patents: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine 4,186,803; Mondshine U.S. Pat. No. 4,369,843; Mondshine U.S. Pat. No. 4,620,596; and Dobson, Jr. et al. U.S. Pat. No. 4,822,500.

These fluids generally contain polymeric viscosifiers such as certain polysaccharides or polysaccharide derivatives, polymeric fluid loss control additives such as lignosulfonates, polysaccharides or polysaccharide derivatives, and bridging solids. As disclosed in Dobson, Jr. et al. U.S. Pat. No. 4,822,500, the polymeric viscosifier and the polymeric fluid loss control additive may synergistically interact to provide suspension and fluid loss control in such fluids.

After the wellbore fluid has completed its desired functions, it is desirable to remove the filter cake before placing the well on production. The filter cake contains the polymers and bridging solids present in the wellbore fluid as well as any other nonsoluble solids present therein. One such method of removing the filter cake is disclosed in Mondshine et al. U.S. Pat. No. 5,238,065. This method comprises contacting the filter cake with an acidic brine fluid containing certain peroxides for a period of time sufficient to decompose the polysaccharide polymers in the filter cake, and preferably thereafter contacting the filter cake with a fluid in which the bridging particles are soluble.

SUMMARY OF THE INVENTION

The present invention provides (1) a method of reducing the fluid loss of well drilling and servicing fluids which contain at least one polymeric viscosifier, at least one polymeric fluid loss control additive, and a water soluble bridging agent suspended in an aqueous liquid in which the bridging agent is not soluble, and (2) a method of reducing the concentration of polymer required to provide a desired degree of fluid loss control to such fluids, which comprises adding to the fluid a particulate, water soluble, ultra fine filtrate reducing agent having a particle size distribution such that at least 90% of the particles thereof are less than 10 micrometers and the average particle size is from about 3 to about 5 micrometers.

Thus it is an object of this invention to provide a method of reducing the fluid loss of well drilling and servicing fluids which contain at least one polymeric viscosifier, at least one polymeric fluid loss control additive, and a water soluble bridging agent suspended in a liquid in which the bridging agent is not soluble.

It is another object of the invention to provide a method of reducing the concentration of polymer required to provide a desired degree of fluid loss control to such fluids.

Another object of this invention is to provide lower cost wellbore fluids which deposit filter cakes containing decreased polymer concentrations and hence which are easier to remove from the sides of a borehole.

These and other objects of the invention will be obvious to one skilled in the art on reading this specification and the claims appended hereto.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

We have now discovered that the fluid loss of certain polymer-containing, well drilling and servicing fluids as set forth hereinafter can be decreased by incorporating therein a particulate, water soluble, ultra fine filtrate reducing agent having a particle size distribution such that at least 90% of the particles thereof are less than 10 micrometers and the average particle size is from about 3 to about 5 micrometers. Alternatively, we have discovered that for any desired degree of fluid loss control of certain polymer-containing well drilling and servicing fluids, the polymer concentration can be decreased by incorporating in the fluids a particulate, water soluble, ultra fine filtrate reducing agent having a particle size distribution such that at least 90% of the particles thereof are less than 10 micrometers and the average particle size is from about 3 to about 5 micrometers.

Hereinafter the term "UFFRA" may be used herein and is intended to mean the particulate, water soluble, ultra fine filtrate reducing agent having a particle size less than 10 micrometers equivalent spherical diameter and an average particle size from about 3 to about 5 micrometers equivalent spherical diameter.

The well drilling and servicing fluids to which this invention pertains contain at least one polymeric viscosifier or suspending agent, at least one polymeric fluid loss control additive, and a water soluble bridging agent suspended in an aqueous liquid in which the bridging agent is not soluble. See for example U.S. Pat. No. 4,175,042 (Mondshine) and U.S. Pat. No. 4,822,500 (Dobson et at.), each incorporated herein by reference.

The colloidal properties of polymers greatly affect the role of such polymers in well drilling and servicing fluids. They have a strong affinity for water. They develop highly swollen gels in low concentrations. Most polymers do not swell as much in salt water as they do in fresh water; however, they nevertheless provide slimy particles of such size as to resist the flow of water through a filter cake. These versatile polymers make practical the use of low-solids, non-dispersive well drilling and servicing fluids. The great diversity in composition and properties of the polymers used in well drilling and servicing fluids requires an examination of the factors involved in the selection of a polymer for a specific application. Among the factors which affect performance are the effects of temperature, shear conditions, dissolved salts, pH, and stability to microorganisms. Other factors considered in choosing a polymer include ease of degradation, ease of handling and mixing, possible environmental and health effects, and the cost of the polymer.

Polymeric viscosifiers or suspending agents used in well drilling and servicing fluids include certain natural gums, synthetic gums (called biopolymers since they are produced by bacterial or fungal action on suitable substrates), polysaccharide derivatives, and synthetic copolymers. Representative polymeric viscosifiers or suspending agents include xanthan gum; welan gum; gellan gum; guar gum; hydroxyalkyl guar gums such as hydroxypropyl guar, hydroxyethyl guar, carboxymethyl hydroxypropyl guar, dihydroxypropyl guar, and the like; cellulose ethers such as carboxymethyl cellulose, hydroxyethyl cellulose, carboxymethyl hydroxyethyl cellulose, and the like; polyacrylates; ethylene oxide polymers; and the like. The preferred polymeric viscosifiers or suspending agents are xanthan gum, welan gum, gellan gum, hydroxyalkyl guar gum, high viscosity (high molecular weight) carboxymethyl cellulose, and mixtures thereof, most preferably xanthan gum.

Polymeric fluid loss control additives used in well drilling and servicing fluids include pregelatized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxyethyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include partially hydrolyzed polyacrylamides, polyacrylates, and the like. The preferred polymeric fluid loss control additives are the starch ether derivatives such as hydroxyethyl starch, hydroxypropyl starch, dihydroxypropyl starch, carboxymethyl starch, and cationic starches, and carboxymethyl cellulose. Most preferably the polymeric fluid loss control additive is a starch ether derivative which has been slightly crosslinked, such as with epichlorohydrin, phosphorous oxychloride, soluble trimetaphosphates, linear dicarboxylic acid anhydrides, N,N'-methylenebisacrylamide, and other reagents containing two or more functional groups which are able to react with at least two hydroxyl groups. The preferred crosslinking reagent is epichlorohydrin. Generally the treatment level is from about 0.005% to 0.1% of the starch to give a low degree of crosslinking of about one crosslink per 200 to 1000 anhydroglucose units.

The bridging agents useful in this invention are well known in the art. They are solid, particulate, water soluble salts the particles of which have been sized to have a particle size distribution sufficient to seal off the pores of the formations contacted by the well drilling and servicing fluid. The bridging agent must not be soluble in the liquid used to prepare the fluid. Representative water soluble salts include sodium chloride, potassium chloride, calcium chloride, sodium formate, potassium formate, sodium bromide, potassium bromide, calcium bromide, sodium acetate, potassium acetate, and the like. The preferred bridging agent is sodium chloride.

It is preferred that the liquid comprises a saturated solution of one or more water soluble salts, such as the chloride, bromide, formate or acetate salts of sodium, potassium, or calcium, most preferably sodium chloride, sodium bromide, or calcium chloride.

The UFFRA of this invention may be any solid, particulate, water soluble salt having the required particle size which is insoluble in the liquid used to prepare the well drilling and servicing fluid. It may for instance be a bridging agent which has been ground to the extremely ultra fine particle size required. The preferred UFFRA is sodium chloride.

The concentration of UFFRA must be sufficient to reduce the fluid loss of the well drilling and servicing fluid in which it is incorporated. Generally, a concentration of UFFRA from about 2.5 kg/m$^3$ to about 85 kg/m$^3$ will be used, preferably from about 5 kg/m$^3$ to about 60 kg/m$^3$.

The addition of the UFFRA to the well drilling and servicing fluid does not appreciably effect the viscosity of the fluid at circulating shear rates; however, the low shear viscosity and hence the suspension properties of the fluid is generally increased. The polymeric filtrate reducing agents of the prior art are hydratable colloids and increase the viscosity of the fluid at all shear rates.

Well drilling and servicing fluids as described herein having a desired degree of filtration control can be formulated to contain less polymer by incorporating the UFFRA in the fluids. This results in a fluid having a lower viscosity at circulating shear rates, and a lower cost. Polymer concentrations may be reduced by up to about 50% in specific fluid formulations. The reduction in polymer concentration also provides for more efficient filter cake removal from the sides of the borehole in hydrocarbon producing formations. Filter cakes containing less polymer are more easily decomposed when utilizing polymer degrading compositions, such as those disclosed in Mondshine et al. U.S. Pat. No. 5,238,065. This results in: decreased clean-up time and hence lower cost to remove the filter cake; and the use of lesser strength polymer decomposing compositions, and hence decreased corrosion rates and decreased corrosion inhibitor requirements. Higher density fluids, formulated with inert weighting solids, can be obtained due to the reduced viscosity provided by the decreased polymer concentrations.

These and other benefits and advantages of the invention will be obvious to one skilled in the art upon reading the foregoing description of the invention.

In order to more completely describe the invention, the following non-limiting examples are given. In these examples and this specification, the following abbreviations may be used: API=American Petroleum Institute; PSS= Particulate Sized Salt (NaCl); ECHXHPS=epichlorohydrin crosslinked hydroxypropyl starch; UFS=Ultra Fine Salt (NaCl); PSC=particulate sodium chloride; bbl=42 gallon barrel; lb/bbl=pounds per barrel; hr=hours; rpm=revolutions per minute; cc=cubic centimeters; °F.=degrees Fahrenheit; lb/gal=pounds per gallon; %=percent by weight;

mm=millimeters; kg/m³=kilogram per cubic meter; ¹/₃₂"=¹/₃₂ inch; Tr=Trace; PV=plastic viscosity in centipoise; YP=yield point in pounds per 100 square feet; Gel=10 second/10 minute gel strengths in pounds per 100 square feet; LSV=Brookfield low shear viscosity at 0.3 revolutions per minute, in centipoise.

The plastic viscosity, yield point, and gel strengths were obtained by the procedures set forth in API's Recommended Practice 13 B-1. The LSV was obtained for the fluids using a Brookfield Model LVTDV-I viscometer having a number 2 spindle at 0.3 revolutions per minute. The LSV is indicative of the suspension properties of the fluid, the larger the LSV, the better is the suspension of solids in the fluid. All high temperature, high pressure (HTHP) filtration data were obtained by a modified API filtration test. Thus to an API high temperature filtration cell with removable end cages is added a screen having 44 micron openings. There is then added 67.5 grams of a sized sand to produce a 1.5 cm sand bed. The sized sand has a particle such that all of the sand passes through a screen having 177 micron openings and is retained on a screen having 125 micron openings. The fluid to be tested is poured along the inside edge of the filtration cell so as not to disturb the sand bed. The filtration test is then conducted for 30 minutes at the desired temperature of 250° F. under a pressure differential of 17.59 kg/cm² (250 pounds per square inch) supplied by nitrogen.

Brine A is a 10.0 lb/gal NaCl brine. Brine B is a 12.5 lb/gal NaBr brine. The particulate sized salt (NaCl) bridging agents used in the examples have the particle size distribution set forth in Table A. These were determined utilizing an ALPINE Micron Air Jet Sieve™. The size of the sieve openings in micrometers (microns) for the various sieve mesh sizes set forth herein are as follows: 100 mesh=149 microns, 200 mesh=74 microns, 325 mesh=44 microns, 450 mesh=32 microns, and 635 mesh=20 microns. Thus a particle size designation of +100 mesh indicates that the particles are >149 microns (greater than 149 microns). A particle size designation of 100/200 mesh indicates that the particles are <149 microns (less than 149 microns) and >74 microns. A particle size of 200/325 mesh indicates that the particles are <74 microns and >44 microns. A particle size of 325/450 mesh indicates that the particles are <44 microns and >32 microns. A particle size of 450/635 mesh indicates that the particles are <32 microns and >20 microns. A particle size of -635 mesh indicates that the particles are <20 microns.

The Ultra Fine Salt (NACl) filtrate reducing additive of this invention has a size distribution such that about 90% of the particles are less than 10 micrometers equivalent spherical diameter and an average particle size from about 3 to about 5 micrometers equivalent spherical diameter. Specifically, the UFS has a size distribution such that about 100% of the particles are less than 18 micrometers, about 91.7% of the particles are less than 10.5 micrometers, about 81% of the particles are less than 7.5 micrometers, about 62.7% of the particles are less than 5.0 micrometers, about 50% of the particles are less than 3.75 micrometers, about 31% of the particles are less than 2.2 micrometers, about 20.5% of the particles are less than 1.5 micrometers, and about 10% of the particles are less than 0.93 micrometers, and the average particle size is 3.76 micrometers.

The particulate sodium chloride samples evaluated for comparison with the ultra fine sodium chloride of this invention have the following particle sizes. PSC #1-98.6%<37.8 μm, 84.6%<25.5 μm, 49.7%<17.1 μm, 17.6%<11.5 μm, 3.2%<7.8 μm, and the average particle size is 17.2 micrometers. PSC #2-99.9%<83.3 μm, 94.7%<56.1 μm, 59.7%<37.8 μm, 15.1%<25.5 μm, 0.6%<17.1 μm, and the average particle size is 35.1 micrometers.

TABLE A

| Particulate Sized Salt | Particle Size Distribution % By Weight Retained | | | | | |
|---|---|---|---|---|---|---|
| | +100 | 100/200 | 200/325 | 325/450 | 450/635 | −635 |
| PSS #1 | Tr | Tr | 2 | 4 | 25 | 69 |
| PSS #2 | 1 | 9 | 17 | 12 | 23 | 38 |
| PSS #3 | 0 | 1 | 7 | 10 | 23 | 59 |
| PSS #4 | 2 | 9 | 19 | 12 | 22 | 36 |

EXAMPLE I

A series of well drilling and servicing fluids were prepared having the compositions set forth in Table 1. These were evaluated for API rheology, low shear viscosity, pH and HTHP filtration characteristics. The data obtained are given in Table 1.

EXAMPLE II

A series of well drilling and servicing fluids were prepared wherein the concentrations of the polysaccharides, particulate sized salt bridging particles, and the ultra fine salt of this invention were varied. These fluids were evaluated for their high temperature, high pressure filtration characteristics using the procedure disclosed herein. The data obtained are given in Tables 2, 3, and 4.

The fluids which did not contain any ultra fine salt, as required by this invention, are prior art control fluids. Comparison of the data for the fluids of this invention with the data for the control fluids indicates the lower fluid losses for the fluids of this invention or the lower polymer concentrations required in the fluids of this invention for equal fluid loss control.

EXAMPLE III

Well drilling and servicing fluids having the compositions set forth in Table 5 were prepared and evaluated for their high temperature, high pressure filtration characteristics using the procedure disclosed herein. The data obtained are given in Table 5.

Compositions containing the ultra fine sodium chloride filtrate reducing agent of this invention (UFS) can be compared with particulate sodium chloride having a larger particle size distribution (PSC #1 and PSC #2). The data readily indicates that the ultra fine salt of this invention reduced the fluid loss while the salt samples having the larger particle size did not reduce the fluid loss or even increased it.

TABLE 1

| Fluid Composition | #1 | #2 | #3 | #4 | #5 | #6 | #7 |
|---|---|---|---|---|---|---|---|
| Brine A, bbl | 0.96 | 0.96 | 0.96 | 0.94 | 0.94 | 0.94 | 0.94 |
| Brine B, bbl | 0 | 0 | 0 | 0 | 0 | 0 | 0 |
| Xanthan Gum, lb/bbl | 1.25 | 1.25 | 1.25 | 1 | 1 | 1 | 1 |
| ECHXHPS, lb/bbl | 3.75 | 3.75 | 3.75 | 3 | 3 | 3 | 6 |
| MgO, lb/bbl | 0 | 0 | 0 | 0 | 0 | 0 | 0 |
| PSS #1, lb/bbl | 28 | 22.4 | 19.6 | 46 | 32.2 | 27.6 | 46 |
| UFS, lb/bbl | 0 | 5.6 | 8.4 | 0 | 13.8 | 18.4 | 0 |
| Density, lb/gal | 10.3 | 10.3 | 10.3 | 10.5 | 10.5 | 10.5 | 10.5 |
| Rheology | | | | | | | |
| 600 rpm | 53 | 56 | 54 | 44 | 45 | 44 | 60 |
| 300 rpm | 37 | 39 | 38 | 31 | 31 | 31 | 42 |
| 200 rpm | 31 | 33 | 32 | 25 | 25 | 25 | 35 |
| 100 rpm | 24 | 25 | 24 | 18 | 19 | 19 | 26 |
| 6 rpm | 10 | 11 | 11 | 8 | 8 | 8 | 10 |
| 3 rpm | 9 | 9 | 9 | 6 | 7 | 7 | 9 |
| PV | 16 | 17 | 16 | 13 | 14 | 13 | 18 |
| YP | 21 | 22 | 22 | 18 | 17 | 18 | 24 |
| 10 sec./10 min. Gels | 11/14 | 11/14 | 11/15 | 8/10 | 8/10 | 8/10 | 9/12 |
| LSV | 34200 | 37300 | 38700 | 16800 | 18400 | 18300 | 26500 |
| pH | 8.10 | 7.95 | 8.0 | 7.1 | 7.2 | 7.2 | 7.9 |
| HTHP Filtrate | | | | | | | |
| Spurt Loss, cc. | Trace | 0 | 0 | 2.0 | 1.6 | 1.0 | 1.0 |
| 30 min., cc | 5.25 | 2.4 | 2.5 | 14.5 | 3.4 | 5.1 | 3.6 |
| Cake Thickness, 1/32" | 2 | 2 | 2 | 3 | 1 | 3 | 2 |

| Fluid Composition | #8 | #9 | #10 | #11 | #12 | #13 | #14 |
|---|---|---|---|---|---|---|---|
| Brine A, bbl | 0.75 | 0.75 | 0.73 | 0.73 | 0.73 | 0 | 0 |
| Brine B, bbl | 0 | 0 | 0 | 0 | 0 | 0.70 | 0.70 |
| Xanthan Gum, lb/bbl | 0.25 | 0.25 | 0.25 | 0.25 | 0.25 | 0.25 | 0.25 |
| ECHXHPS, lb/bbl | 8.75 | 8.75 | 8.75 | 8.75 | 8.75 | 6.75 | 6.75 |
| MgO, lb/bbl | 0 | 0 | 0 | 0 | 0 | 2 | 2 |
| PSS #2, lb/bbl | 190 | 180 | 206 | 195.7 | 185.4 | 229 | 217.5 |
| UFS, lb/bbl | 0 | 10 | 0 | 10.3 | 20.6 | 0 | 11.5 |
| Density, lb/gal | 12.0 | 12.0 | 12.2 | 12.2 | 12.2 | 14.2 | 14.2 |
| Rheology | | | | | | | |
| 600 rpm | 118 | 117 | 116 | 120 | 105 | 247 | 262 |
| 300 rpm | 73 | 73 | 72 | 74 | 64 | 154 | 164 |
| 200 rpm | 56 | 56 | 55 | 57 | 49 | 117 | 125 |
| 100 rpm | 35 | 35 | 34 | 36 | 30 | 73 | 78 |
| 6 rpm | 6 | 7 | 6 | 6 | 5 | 12 | 13 |
| 3 rpm | 4 | 5 | 4 | 4 | 3 | 8 | 8 |
| PV | 45 | 44 | 44 | 46 | 41 | 93 | 98 |
| YP | 28 | 29 | 28 | 28 | 23 | 61 | 66 |
| 10 sec./10 min. Gels | 5/5 | 5/6 | 4/6 | 4/6 | 4/5 | 8/9 | 8/10 |
| LSV | 3300 | 5200 | 3600 | 5900 | 4500 | 7100 | 7000 |
| pH | 7.9 | 7.9 | 7.75 | 7.75 | 7.75 | 8.5 | 8.55 |
| HTHP Filtrate | | | | | | | |
| Spurt Loss, cc | 3.0 | 1.5 | 2.3 | 1.0 | 3.3 | 2.9 | Tr |
| 30 min., cc | 8.0 | 4.5 | 5.9 | 4.9 | 5.5 | 4.0 | 1.8 |
| Cake Thickness, 1/32" | 10 | 8 | 10 | 8 | 8 | 8 | 6 |

| Fluid Composition | #15 | #16 | #17 | #18 | #19 | #20 |
|---|---|---|---|---|---|---|
| Brine A, bbl | 0 | 0 | 0 | 0 | 0 | 0 |
| Brine B, bbl | 0.70 | 0.65 | 0.65 | 0.65 | 0.65 | 0.65 |
| Xanthan Gum, lb/bbl | 0.25 | 0.25 | 0.25 | 0.25 | 0.25 | 0.25 |
| ECHXHPS, lb/bbl | 6.75 | 6.75 | 6.75 | 4.75 | 4.75 | 4.75 |
| MgO, lb/bbl | 2 | 2 | 2 | 2 | 2 | 2 |
| PSS #2, lb/bbl | 206.1 | 270 | 256.5 | 270 | 256.5 | 243 |
| UFS, lb/bbl | 22.9 | 0 | 13.5 | 0 | 13.5 | 27 |
| Density, lb/gal | 14.2 | 14.5 | 14.5 | 14.5 | 14.5 | 14.5 |
| Rheology | | | | | | |
| 600 rpm | 249 | 344 | 368 | 294 | 274 | 285 |
| 300 rpm | 154 | 220 | 230 | 177 | 168 | 172 |
| 200 rpm | 117 | 166 | 174 | 132 | 126 | 129 |
| 100 rpm | 74 | 104 | 110 | 80 | 78 | 79 |
| 6 rpm | 12 | 14 | 18 | 12 | 12 | 12 |
| 3 rpm | 8 | 11 | 12 | 8 | 8 | 8 |
| PV | 95 | 124 | 138 | 117 | 106 | 113 |
| YP | 59 | 96 | 92 | 60 | 62 | 59 |
| 10 sec./10 min. Gels | 8/10 | 12/14 | 12/14 | 8/9 | 8/11 | 8/10 |

TABLE 1-continued

| | | | | | | |
|---|---|---|---|---|---|---|
| LSV | 7900 | 11100 | 10100 | 8800 | 10400 | 9500 |
| pH | 8.55 | 8.55 | 8.6 | 8.6 | 8.5 | 8.6 |
| HTHP Filtrate | | | | | | |
| Spurt Loss, cc | Tr | 1.8 | 0 | 2.0 | 1.5 | 1.0 |
| 30 min., cc | 1.4 | 3.8 | 0 | 9.5 | 6.5 | 7.8 |
| Cake Thickness, 1/32" | 6 | 9 | 7 | 16 | 14 | 15 |

TABLE 2

| Fluid Composition | #21 | #22 | #23 | #24 | #25 | #26 |
|---|---|---|---|---|---|---|
| Brine A, bbl | 0.94 | 0.94 | 0.94 | 0.94 | 0.94 | 0.94 |
| Xanthan Gum, lb/bbl | 1.25 | 1.25 | 1 | 1 | 1.25 | 1.25 |
| ECHXHPS, lb/bbl | 3.75 | 3.75 | 3 | 3 | 2 | 2 |
| PSS #1, lb/bbl | 46 | 36.8 | 46 | 36.8 | 46 | 36.8 |
| UFS, lb/bbl | 0 | 9.2 | 0 | 9.2 | 0 | 9.2 |
| Density, lb/gal | 10.5 | 10.5 | 10.5 | 10.5 | 10.5 | 10.5 |
| HTHP Filtrate | | | | | | |
| Spurt Loss, cc | 1.0 | 1.25 | 1.0 | 1.0 | 2.25 | 1.0 |
| 30 min., cc | 10.5 | 4.75 | 18.0 | 9.0 | 17.25 | 12.0 |

| Fluid Composition | #27 | #28 | #29 | #30 |
|---|---|---|---|---|
| Brine A, bbl | 0.94 | 0.94 | 0.94 | 0.94 |
| Xanthan Gum, lb/bbl | 1.25 | 1.25 | 1.25 | 1.25 |
| ECHXHPS, lb/bbl | 3.75 | 3.75 | 3.75 | 3.75 |
| PSS #1, lb/bbl | 46 | 43.7 | 41.4 | 36.8 |
| UFS, lb/bbl | 0 | 2.3 | 4.6 | 9.2 |
| Density, lb/gal | 10.5 | 10.5 | 10.5 | 10.5 |
| HTHP Filtrate | | | | |
| Spurt Loss, cc | 1.75 | Tr | 1.0 | 1.0 |
| 30 min., cc | 16.0 | 9.25 | 6.75 | 5.25 |

TABLE 3

| Fluid Composition | #31 | #32 | #33 | #34 | #35 | #36 |
|---|---|---|---|---|---|---|
| Brine A, bbl | 0.94 | 0.94 | 0.94 | 0.94 | 0.94 | 0.94 |
| Xanthan Gum, lb/bbl | 1.25 | 1.25 | 1 | 1 | 1.25 | 1.25 |
| ECHXHPS, lb/bbl | 3.75 | 3.75 | 3 | 3 | 2 | 2 |
| PSS #2, lb/bbl | 46 | 36.8 | 46 | 36.8 | 46 | 36.8 |
| UFS, lb/bbl | 0 | 9.2 | 0 | 9.2 | 0 | 9.2 |
| Density, lb/gal | 10.5 | 10.5 | 10.5 | 10.5 | 10.5 | 10.5 |
| HTHP Filtrate | | | | | | |
| Spurt Loss, cc | 4.25 | 2.0 | 3.25 | 1.0 | 5.5 | 1.0 |
| 30 min., cc | 18.0 | 5.0 | 22.5 | 8.5 | 21 | 7 |
| Cake Thickness, 1/32" | 2 | 1 | 3 | 1 | 2 | 1.5 |

TABLE 4

| Fluid Composition | #37 | #38 | #39 | #40 | #41 | #42 | #43 |
|---|---|---|---|---|---|---|---|
| Brine A, bbl | 0.94 | 0.94 | 0.94 | 0.94 | 0.94 | 0.94 | 0.94 |
| Xanthan Gum, lb/bbl | 1.25 | 1.25 | 1 | 1 | 1.25 | 1.25 | 1.25 |
| ECHXHPS, lb/bbl | 3.75 | 3.75 | 3 | 3 | 2 | 2 | 5.75 |
| PSS #3, lb/bbl | 46 | 36.8 | 46 | 36.8 | 46 | 36.8 | 46 |
| UFS, lb/bbl | 0 | 9.2 | 0 | 9.2 | 0 | 9.2 | 0 |
| Density, lb/gal | 10.5 | 10.5 | 10.5 | 10.5 | 10.5 | 10.5 | 10.5 |
| HTHP Filtrate | | | | | | | |
| Spurt Loss, cc | 1.5 | 2.0 | 1.5 | 1.5 | 3.75 | 1.75 | 0.5 |
| 30 min., cc | 11.0 | 4.5 | 18.5 | 9.5 | 22.5 | 9.0 | 7.0 |
| Cake Thickness, 1/32" | 2 | 1 | 3 | 2 | 3 | 2 | 1.5 |

TABLE 5

Fluid Composition: 0.94 bbl Brine A, 1.25 lb/bbl Xanthan Gum, 3.75 lb/bbl ECHXHPS, indicated concentrations of PSS #4, UFS, PSC #1, and PSC #2.

| Fluid No. | lb/bbl PSS #4 | lb/bbl UFS | lb/bbl PSC #1 | lb/bbl PSC #2 | HTHP Filtrate Spurt Loss, cc | HTHP Filtrate 30-min Loss, cc |
|---|---|---|---|---|---|---|
| 44 | 46 | 0 | 0 | 0 | 5 | 19.8 |
| 45 | 43.7 | 2.3 | 0 | 0 | Tr | 8.0 |
| 46 | 41.4 | 4.6 | 0 | 0 | 0 | 5.3 |
| 47 | 36.8 | 9.2 | 0 | 0 | 0 | 3.0 |
| 48 | 43.7 | 0 | 2.3 | 0 | 4.5 | 21.2 |
| 49 | 41.4 | 0 | 4.6 | 0 | 2 | 18.5 |
| 50 | 36.8 | 0 | 9.2 | 0 | 2 | 19.2 |
| 51 | 43.7 | 0 | 0 | 2.3 | 3.8 | 43.7 |
| 52 | 41.4 | 0 | 0 | 4.6 | 7.2 | 23.5 |
| 53 | 36.8 | 0 | 0 | 9.2 | 7.5 | 25 |

What is claimed is:

1. A method of reducing the fluid loss of well drilling and servicing fluids which contain at least one polymeric viscosifier, at least one polymeric fluid loss control additive, and a water soluble salt bridging agent suspended in a saturated salt solution in which the bridging agent is not soluble, which comprises adding to the fluid a particulate, water soluble, ultra fine salt filtrate reducing agent having a particle size distribution such that at least 90% of the particles thereof are less than 10 micrometers and the average particle size is from about 3 to about 5 micrometers, wherein the concentration of the ultra fine filtrate reducing agent is sufficient to reduce the fluid loss of the fluid.

2. The method of claim 1 wherein the saturated salt solution is prepared by dissolving one or more soluble salts in water, a natural brine, or sea water.

3. The method of claim 2 wherein the salt is selected from the group consisting of the chloride, bromide, acetate, and formate salts of sodium, potassium, and calcium, and mixtures thereof.

4. The method of claim 3 wherein the ultra fine salt filtrate reducing agent is one or more water soluble salts which are not soluble in the saturated solution.

5. The method of claim 4 wherein the bridging agent and the ultra fine salt filtrate reducing agent are sodium chloride.

6. The method of claim 5 wherein the saturated salt solution is a saturated sodium chloride solution.

7. The method of claim 3 wherein the concentration of ultra fine salt filtrate reducing agent is from about 2.5 kg/m$^3$ to about 85 kg/m$^3$.

8. The method of claim 4 wherein the concentration of ultra fine salt filtrate reducing agent is from about 2.5 kg/m$^3$ to about 85 kg/m$^3$.

9. The method of claim 5 wherein the concentration of ultra fine salt filtrate reducing agent is from about 2.5 kg/m$^3$ to about 85 kg/m$^3$.

10. The method of claim 6 wherein the concentration of ultra fine salt filtrate reducing agent is from about 2.5 kg/m$^3$ to about 85 kg/m$^3$.

11. A method of providing a desired degree of fluid loss control to a well drilling and servicing fluid which contains at least one polymeric viscosifier, and a water soluble salt bridging agent suspended in a saturated solution in which the bridging agent is not soluble, which comprises adding to the fluid at least one polymeric fluid loss control additive and a particulate, water soluble, ultra fine salt filtrate reducing agent having a particle size distribution such that at least 90% of the particles thereof are less than 10 micrometers and the average particle size is from about 3 to about 5 micrometers, wherein the concentration of the polymeric fluid loss control additive is less than the concentration which would be required to provide the desired degree of fluid loss control in the absence of the ultra fine salt filtrate reducing agent.

12. The method of claim 11 wherein the saturated salt solution is prepared by dissolving one or more soluble salts in water, a natural brine, or sea water.

13. The method of claim 12 wherein the salt is selected from the group consisting of the chloride, bromide, acetate, and formate salts of sodium, potassium, and calcium, and mixtures thereof.

14. The method of claim 13 wherein the ultra fine salt filtrate reducing agent is one or more water soluble salts which are not soluble in the saturated solution.

15. The method of claim 14 wherein the bridging agent and the ultra fine salt filtrate reducing agent are sodium chloride.

16. The method of claim 15 wherein the saturated salt solution is a saturated sodium chloride solution.

17. The method of claim 14 wherein the concentration of the ultra fine salt filtrate reducing agent is from about 2.5 $kg/m^3$ to about 85 $kg/m^3$.

18. The method of claim 15 wherein the concentration of the ultra fine salt filtrate reducing agent is from about 2.5 $kg/m^3$ to about 85 $kg/m^3$.

19. The method of claim 16 wherein the concentration of the ultra fine salt filtrate reducing agent is from about 2.5 $kg/m^3$ to about 85 $kg/m^3$.

20. The method of claim 1, 5, 6, or 10 wherein the polymeric viscosifier is a xanthan gum and wherein the polymeric fluid loss control additive is a starch ether derivative.

21. The method of claim 11, 15, 16, or 19 wherein the polymeric viscosifier is a xanthan gum and wherein the polymeric fluid loss control additive is a starch ether derivative.

* * * * *